(12) United States Patent
Tu et al.

(10) Patent No.: US 12,462,479 B2
(45) Date of Patent: Nov. 4, 2025

(54) RECONSTRUCTION METHOD OF THREE DIMENSIONAL MODEL AND COMPUTING APPARATUS

(71) Applicants: Yu-Wei Tu, New Taipei (TW); HOMEE AI Technology Inc., Taipei (TW)

(72) Inventors: Yu-Wei Tu, New Taipei (TW); Chun-Kai Chang, New Taipei (TW)

(73) Assignees: Yu-Wei Tu, New Taipei (TW); HOMEE AI Technology Inc., Taipei (TW)

( * ) Notice: Subject to any disclaimer, the term of this patent is extended or adjusted under 35 U.S.C. 154(b) by 181 days.

(21) Appl. No.: 18/455,596

(22) Filed: Aug. 24, 2023

(65) Prior Publication Data
US 2024/0119667 A1 Apr. 11, 2024

Related U.S. Application Data

(60) Provisional application No. 63/413,629, filed on Oct. 6, 2022.

(30) Foreign Application Priority Data

Nov. 11, 2022 (TW) .................................. 111143179

(51) Int. Cl.
*G06T 17/00* (2006.01)
(52) U.S. Cl.
CPC ..................... *G06T 17/00* (2013.01)
(58) Field of Classification Search
CPC .................. G06T 17/00; G06T 2210/04; G06T 2219/2021; G06T 19/20
See application file for complete search history.

(56) References Cited

U.S. PATENT DOCUMENTS

| 10,867,430 B2 | 12/2020 | Lucas et al. |
| 2005/0057561 A1* | 3/2005 | El-Din ElShishiny ..................... G06T 17/20 345/419 |

(Continued)

FOREIGN PATENT DOCUMENTS

| CN | 105427252 | 3/2016 |
| CN | 109118589 | 1/2019 |

(Continued)

OTHER PUBLICATIONS

Harary, G., Tal, A., & Grinspun, E. (2014). Context-based coherent surface completion. ACM Transactions on Graphics (TOG), 33(1), 1-12. (Year: 2014).*

(Continued)

*Primary Examiner* — Daniel F Hajnik
*Assistant Examiner* — Adeel Bashir
(74) *Attorney, Agent, or Firm* — JCIPRNET

(57) ABSTRACT

A reconstruction method of a three dimensional (3D) model and a computing apparatus are provided. In the method, multiple structures in the 3D model are determined. An object in the 3D model is separated from an original location to form a hollow. The hollow is adjacent to at least two neighboring structures among the structures. The neighboring structures are respectively extended to cover the hollow. A similarity of an extended part covering the hollow is determined. The similarity is a compared result of an adjacent structure of the extended part. A target structure of the hollow is determined according to the similarity. The target structure is used for compensating the hollow.

8 Claims, 3 Drawing Sheets

(56) References Cited

U.S. PATENT DOCUMENTS

2014/0044343 A1* 2/2014 Bell ............... H04N 13/271
                                                    382/154
2016/0078676 A1* 3/2016 Li ................... G06T 17/20
                                                    345/423

FOREIGN PATENT DOCUMENTS

| CN | 109859114 | 6/2019 |
|----|-----------|--------|
| CN | 113014906 | 6/2021 |
| TW | M638962   | 3/2023 |

OTHER PUBLICATIONS

Barequet, G., & Sharir, M. (1995). Filling gaps in the boundary of a polyhedron. Computer Aided Geometric Design, 12(2), 207-229. (Year: 1995).*

Park, S., Guo, X., Shin, H., & Qin, H. (Oct. 2005). Shape and appearance repair for incomplete point surfaces. In Tenth IEEE International Conference on Computer Vision (ICCV'05) vol. 1 (vol. 2, pp. 1260-1267). IEEE. (Year: 2005).*

Sharf, A., Alexa, M., & Cohen-Or, D. (2004). Context-based surface completion. In ACM SIGGRAPH 2004 Papers (pp. 878-887). (Year: 2004).*

Pérez, E., Salamanca, S., Merchán, P., & Adán, A. (2016). A comparison of hole-filling methods in 3D. International Journal of Applied Mathematics and Computer Science, 26(4). (Year: 2016).*

Park, S., Guo, X., Shin, H., & Qin, H. (2006). Surface completion for shape and appearance. The Visual Computer, 22, 168-180. (Year: 2006).*

* cited by examiner

RECONSTRUCTION METHOD OF THREE DIMENSIONAL MODEL AND COMPUTING APPARATUS

CROSS-REFERENCE TO RELATED APPLICATION

This application claims the priority benefit of the U.S. provisional application Ser. No. 63/413,629, filed on Oct. 6, 2022, and Taiwan application serial no. 111143179, filed on Nov. 11, 2022. The entirety of each of the above-mentioned patent applications is hereby incorporated by reference herein and made a part of this specification.

BACKGROUND

Technical Field

The disclosure is related to a space modeling technique, and more particularly, to a reconstruction method of a three dimensional (3D) model and a computing apparatus.

Description of Related Art

To simulate a real space, the real space can be scanned to generate a simulated space that appears similar to the real space. The simulated space can be implemented in various applications such as gaming, home decoration, robot navigation, etc. It is worth noting that objects in the simulated space can be moved or deleted, but this will leave a hollow in the simulated space.

SUMMARY

The embodiment of the disclosure provides a reconstruction method of a 3D model and a computing apparatus, which may compensate for a hollow.

The reconstruction method of the 3D model in the embodiment of the disclosure includes (but is not limited to) the following process. Multiple structures in a 3D model are determined. An object in the 3D model is separated from an original location to form a hollow. The hollow is adjacent to at least two neighboring structures among the structures. The neighboring structures are respectively extended to cover the hollow. A similarity of an extended part covering the hollow is determined. The similarity is a compared result of an adjacent structure of the extended part. A target structure of the hollow is determined according to the similarity. The target structure is used for compensating the hollow.

The computing apparatus in the embodiment of the disclosure includes a memory and a processor. The memory is configured to store a code. The processor is coupled to the memory. The processor loads the code to execute to following process. Multiple structures in a 3D model are determined. The neighboring structures are respectively extended to cover the hollow. A similarity of an extended part covering the hollow is determined. A target structure of the hollow is determined according to the similarity. An object in the 3D model is separated from an original location to form a hollow. The hollow is adjacent to at least two neighboring structures among the structures. The similarity is a compared result of an adjacent structure of the extended part. The target structure is used for compensating the hollow.

Based on the above, according to the reconstruction method of the 3D model and the computing apparatus in the embodiment of the disclosure, the adjacent structures are extended to fill the hollow, and the target structure of the hollow is determined based on the similarity between the extended part and the adjacent structure. In this way, it is possible to restore, extend, or recreate the hollow in the original spatial model, thereby constructing a completely new and complete spatial model.

In order to make the above-mentioned features and advantages of the disclosure comprehensible, embodiments accompanied with drawings are described in detail below.

DESCRIPTION OF THE EMBODIMENTS

Figure 1:
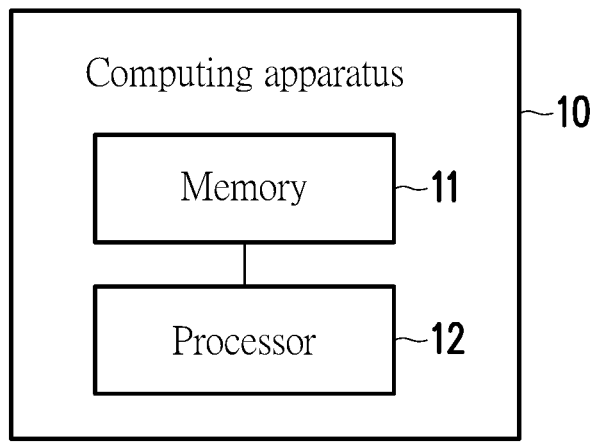
FIG. 1 is a block diagram of elements of a computing apparatus according to an embodiment of the disclosure.

FIG. 1 is a block diagram of elements of a computing apparatus 10 according to an embodiment of the disclosure. Referring to FIG. 1, the computing apparatus 10 may be a mobile phone, a tablet computer, a desktop computer, a laptop, a server, or an intelligent assistant apparatus. The computing apparatus 10 includes (but not limited to) a memory 11 and a processor 12.

The memory 11 may be any type of fixed or movable random access memory (RAM), read only memory (ROM), flash memory, conventional hard disk drive (HDD), solid-state drive (SSD) or similar components. In one embodiment, the memory 11 is configured to store code, software modules, data (e.g., location, depth, or 3D model), or files, which are described in detail in subsequent embodiments.

The processor 12 is coupled to the memory 11. The processor 12 may be a central processing unit (CPU), or other programmable general-purpose or special-purpose microprocessors, a digital signal processor (DSP), a programmable controller, an application-specific integrated circuit (ASIC), other similar components, or combinations of the foregoing. In one embodiment, the processor 12 is configured to execute all or part of the operations of the computing apparatus 10, and may load and execute the code, software module, files, and/or data stored in the memory 11. In one embodiment, the processor 12 performs all or part of the operations of the embodiment of the disclosure. In some embodiments, the software modules or codes stored in the memory 11 may also be implemented by physical circuits.

In the following, the method described in the embodiment of the disclosure is explained with each element in the computing apparatus 10. Each process of the method can be adjusted according to the implementation, and is not limited to thereto.

Figure 2:
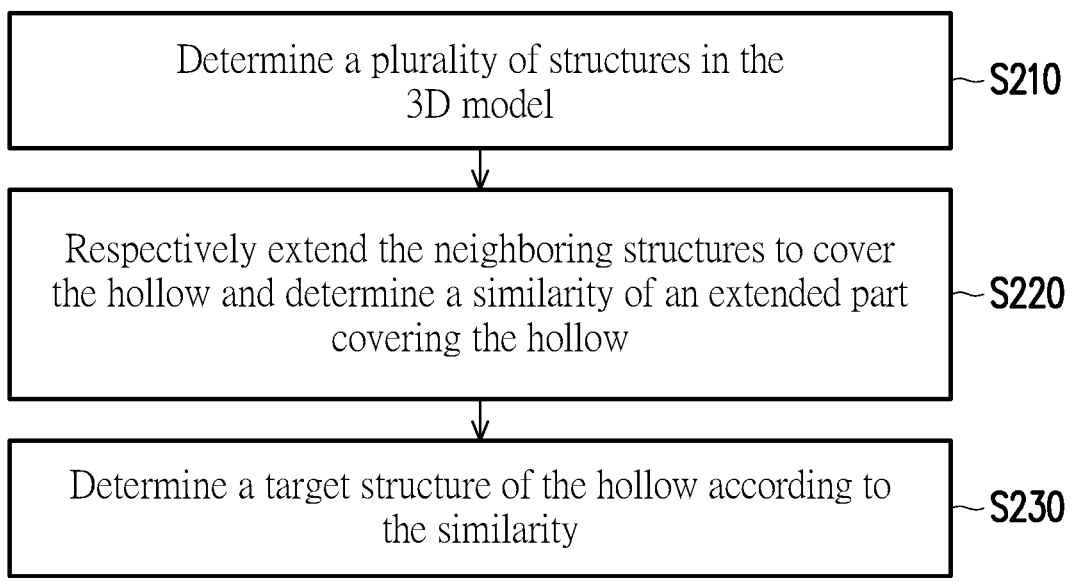
FIG. 2 is a flowchart of a reconstruction method of a 3D model according to an embodiment of the disclosure.

FIG. 2 is a flowchart of a reconstruction method of a 3D model according to an embodiment of the disclosure. Referring to FIG. 2, the processor 12 determines multiple structures in the 3D model (step S210). Specifically, the 3D model may be obtained through a sensor (e.g., an image capture apparatus, a LiDAR, a time-of-flight (ToF) detector, or an inertial measurement unit (IMU)). The model obtained by scanning the real space may also be the model created or modified in a model editing software.

The 3D model may include (virtual) object and structure. The object may include, for example, tables, chairs, appliances, or cabinets. The structure may include, for example, walls, floors, ceilings, or beam columns. In some embodiments, the processor 12 may pre-define the type of structure and regard all units other than the structure as objects. The processor 12 may identify the type of object and/or structure based on algorithms of neural networks (e.g., YOLO (You only look once), region based convolutional neural networks (R-CNN), or Fast R-CNN) or feature-based matching algorithms (e.g., histogram of oriented gradient (HOG), scale-invariant feature transform (SIFT), Harr, or speeded up robust features (SURF)).

Figure 3A:
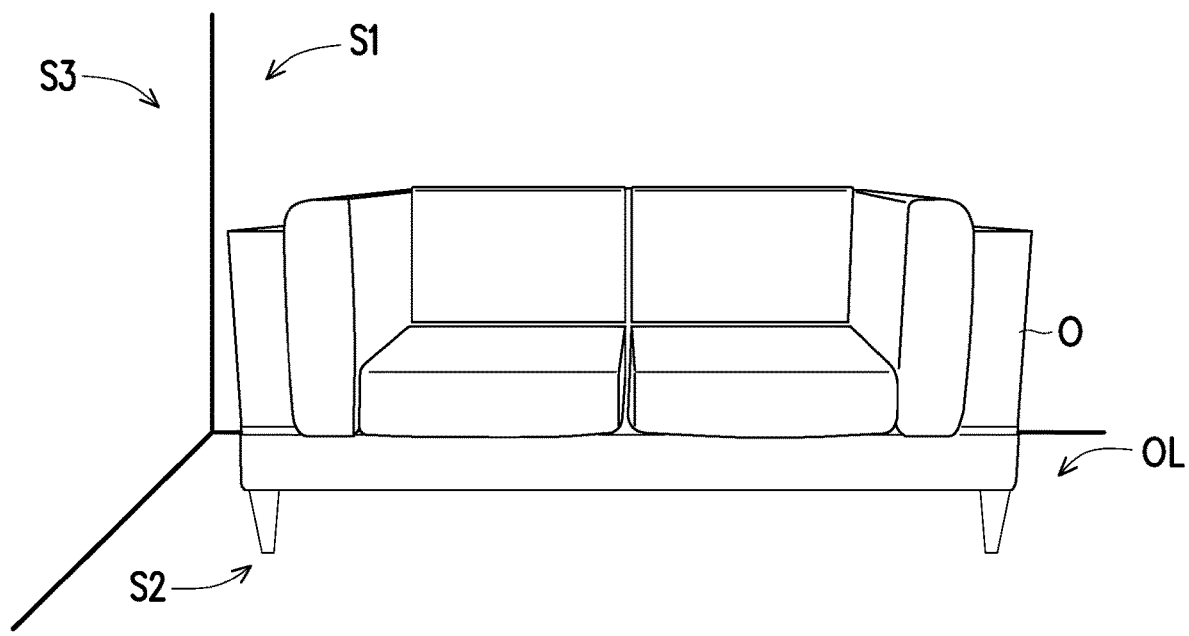
FIG. 3A to FIG. 3D are schematic views of model reconstruction according to an embodiment of the disclosure.
Figure 3B:
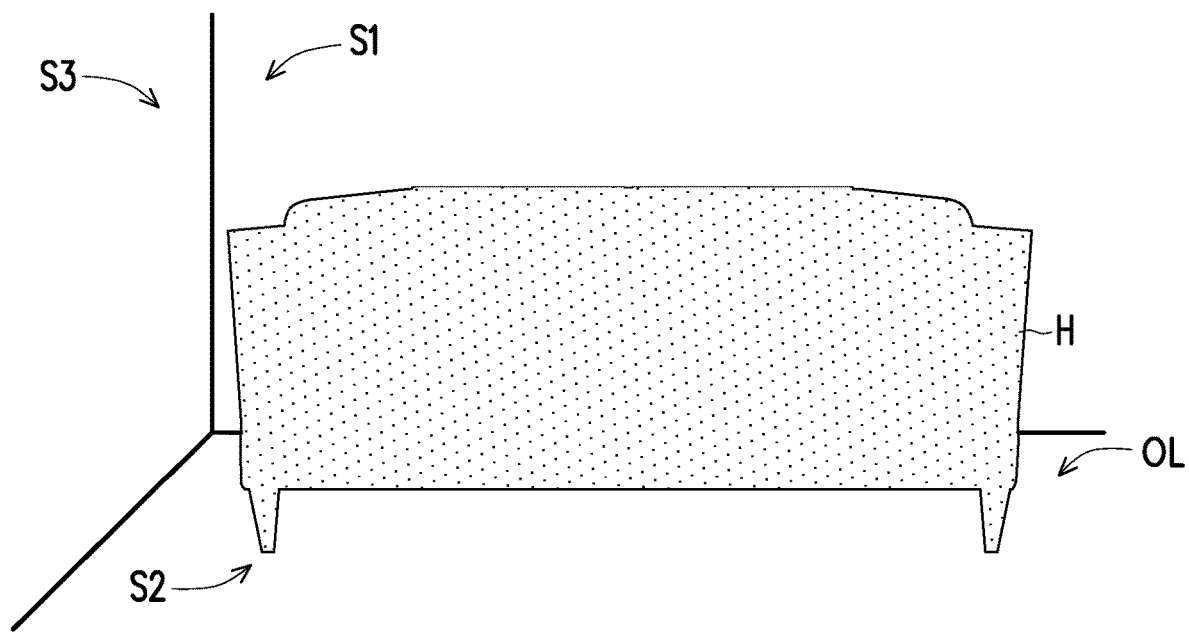

For example, FIG. 3A to FIG. 3D are schematic views of model reconstruction according to an embodiment of the disclosure. Referring to FIG. 3A, the 3D model includes a sofa O (i.e., the object), a wall S1, a floor S2, and a wall S3 (i.e., the structure).

In one embodiment, an object in the 3D model is separated from an original location to form a hollow. For example, an input apparatus (e.g., a mouse, a keyboard, or a touch panel, which is not shown in the figure) receives an operation for moving or dragging a virtual object in the 3D model. Alternatively, an object menu includes a variety of object types for selection, and the selected object may be deleted accordingly. For example, referring to FIG. 3A and FIG. 3B, the sofa O is separated from an original location OL to generate a hollow H in the 3D model. The hollow H may be a part in the 3D model that is not assigned depth information and/or material.

In one embodiment, the hollow is adjacent to at least two neighboring structures among the structures. That is, the hollow is located at the connection of multiple structures. In response to the hollow being located in only one structure, the possibility that the hollow belongs to the structure is high. However, in response to the hollow being adjacent to more than two structures, the hollow may be one or both of the structures. Taking FIG. 3B as an example, it is assumed that the hollow H blocks a part of the wall S1 and the floor S2 (which are regarded as neighboring structures as being directly adjacent to the hollow H) from the viewing angle presented by the figure. Thus, it is necessary to further determine the structure to which the hollow H belongs.

Referring to FIG. 2, the processor 12 respectively extends the neighboring structures to cover the hollow and determines a similarity of an extended part covering the hollow (step S220). Specifically, the processor 12 may analyze an initial structure type of the hollow in the 3D model based on prior knowledge. The prior knowledge is, for example, the type of the adjacent structures. Taking FIG. 3B as an example, the initial structure type of the hollow H may be a wall (corresponding to the wall S1) or a floor (corresponding to the floor S2).

Figure 3C:
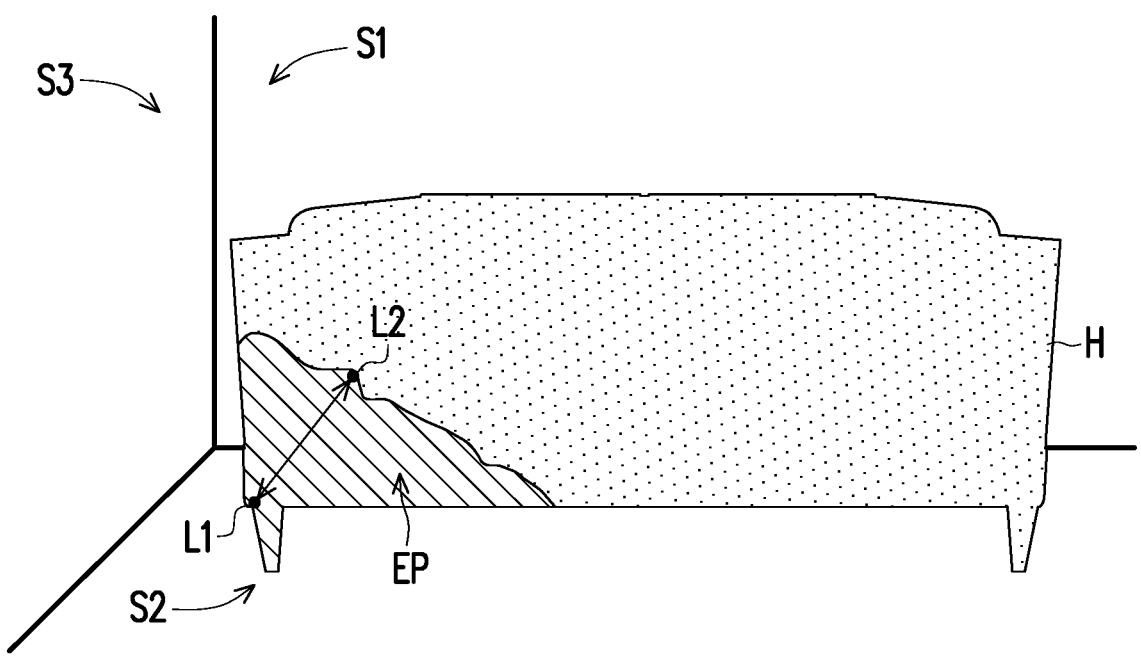
Figure 3D:
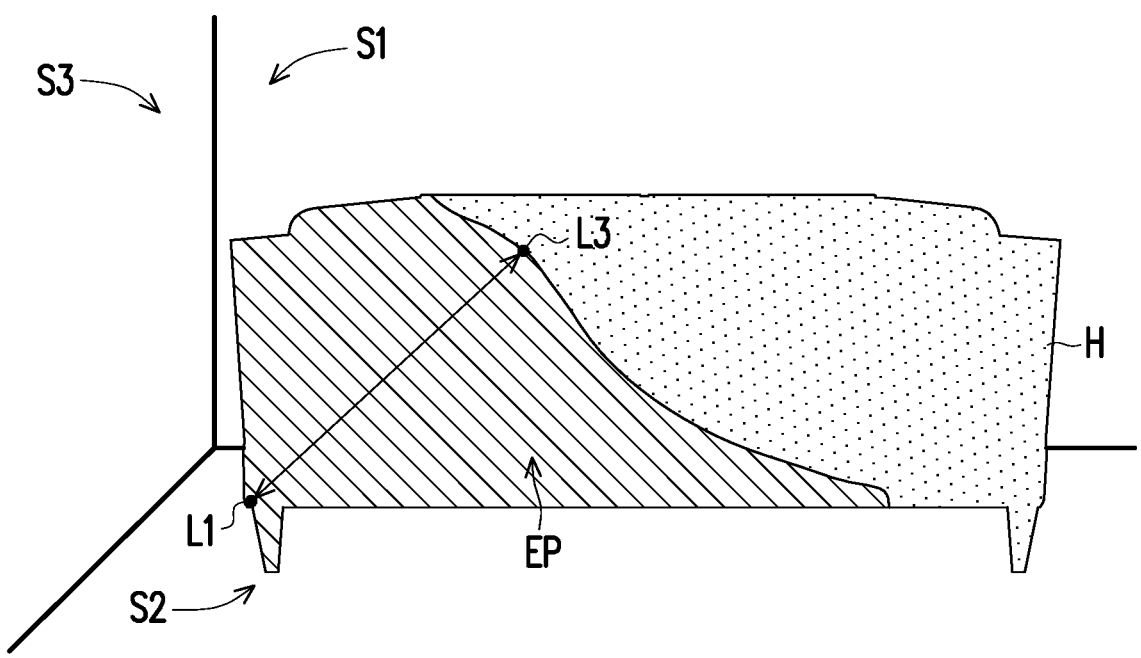

Then, the processor 12 may extend a neighboring structure from a junction of the neighboring structure and the hollow towards the hollow, so that the extended part of the neighboring structure covers the hollow. For example, referring to FIG. 3C, an extended part EP extends from an original point L1 at a junction between the hollow H and the floor S2 (i.e., the neighboring structure) to an extended point L2 and covers the hollow H accordingly. The type of the extended structure is the same as the source of the extension, namely, the floor. Referring to FIG. 3D, the extended part EP continues to extend to an extended point L3.

In one embodiment, the processor 12 may determine a weight of multiple extended points according to a distance between the extended points in the extended part and an original point. The original point is located at a junction of an extended neighboring structure and the hollow. For example, the original point L1 in FIG. 3C is located at the junction between the floor S2 and the hollow H. Generally, the closer the extended points are to the original point, the more likely the structure associated with the extended points belongs to the same structure as the original point, and the processor 12 may define a greater weight. On the other hand, the farther the extended points are from the original point, the less likely the structure associated with the extended point belongs to the structure to which the original point belongs, and the processor 12 may define a smaller weight.

In one embodiment, the weight is inversely proportional to the square of the distance between the extended point and the original point. Taking FIG. 3C and FIG. 3D as examples, the distance between the original point L1 and the extended point L2 is 10 cm, and the weight is 4; the distance between the original point L1 and the extended point L3 is 20 cm, and the weight is 1.

The processor 12 may determine a weighted operation of the weight of the extended points and the corresponding similarity. The similarity is a compared result of an adjacent structure of the extended part. For example, an error between image features of the adjacent structure and image features of the extended points or the distance in a feature space may represent the similarity. The smaller the error is, the higher the similarity; the greater the error, the lower the similarity. For another example, the similarity is a sum of amounts or a weighted sum of amounts of the same features.

Referring to FIG. 2, the processor 12 determines one or more target structures of the hollow according to the similarity (step S230). Specifically, the target structure is used for compensating the hollow. In one embodiment, the processor 12 may determine a matching function according to the weighted operation. The processor 12 may determine the matching function through a least squares method, a mean square error (MSE), a root-mean-square error (RMSE), a least-mean-square error (LMSE), a cosine similarity, a cosine distance, or other error-related algorithms.

Then, the processor 12 may minimize an error between the extended part and the target structure according to the matching function. The processor 12 may change the type of structure of the extended point and/or the extended part and determine the corresponding matching function. For each extended point, the structure corresponding to the smallest error may be concluded to be the target structure of the extended point. Thus, the junction of the hollow and neighboring structures is extended to a closest extended point. The processor 12 may define the target structure from the junction to this extended point (i.e., the highest similarity and the smaller error). Then, extending to the next closest extended point, the processor 12 defines the target structure for this extended point, and so on in a similar manner. The processor 12 may further define the depth information of the extended point. This depth information may be based on a extension line of the adjacent structure.

In one embodiment, the processor 12 determines a material of the target structure according to materials of the at least two neighboring structures. For example, the processor 12 may utilize big data (i.e., a database storing various structures and corresponding materials) and select the material of the part originally blocked by the separated object according to the materials surrounding the hollow and paste the selected material accordingly. The selected material may be the same or similar to that of the neighboring structure.

To sum up, in the reconstruction method of the 3D model and the computing apparatus in the embodiment of the disclosure, the adjacent structure is extended to the hollow and the target structure is determined accordingly. In addition, the material of the hollow is restored by referring to the material surrounding the hollow. In this way, a complete model may be restored and a new space model may be built.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A reconstruction method of a three dimensional (3D) model, comprising:
   determining a plurality of structures in a 3D model, wherein an object in the 3D model is separated from an original location to form a hollow, and the hollow is adjacent to at least two neighboring structures among the structures;
   respectively extending the at least two neighboring structures to cover the hollow, and determining a similarity of an extended part covering the hollow, wherein the similarity is a compared result of an adjacent structure of the extended part; and
   determining a target structure of the hollow according to the similarity, wherein the target structure is used for compensating the hollow,
   wherein determining the similarity of the extended part covering the hollow comprises:
      determining a weight of a plurality of extended points according to a distance between the extended points in the extended part and an original point, wherein the original point is located at a junction of an extended neighboring structure and the hollow; and
      determining a weighted operation of the weight of the extended points and the corresponding similarity.

2. The reconstruction method of the 3D model according to claim 1, wherein determining the target structure of the hollow according to the similarity comprises:
   determining a matching function according to the weighted operation; and
   minimizing an error between the extended part and the target structure according to the matching function.

3. The reconstruction method of the 3D model according to claim 2, wherein minimizing the error between the extended part and the target structure according to the matching function comprises:
   determining the matching function by a least squares method.

4. The reconstruction method of the 3D model according to claim 1, further comprising:
   determining a material of the target structure according to materials of the at least two neighboring structures.

5. A computing apparatus, comprising:
   a memory, configured to store a code; and
   a processor, coupled to the memory and loading the code to execute:
   determining a plurality of structures in a 3D model, wherein an object in the 3D model is separated from an original location to form a hollow, and the hollow is adjacent to at least two neighboring structures among the structures;
   respectively extending the at least two neighboring structures to cover the hollow, and determining a similarity of an extended part covering the hollow, wherein the similarity is a compared result of an adjacent structure of the extended part; and
   determining a target structure of the hollow according to the similarity, wherein the target structure is used for compensating the hollow
   wherein in operation of determining the similarity of the extended part covering the hollow, the processor is further configured for:
      determining a weight of a plurality of extended points according to a distance between the extended points in the extended part and an original point, wherein the original point is located at a junction of an extended neighboring structure and the hollow; and
      determining a weighted operation of the weight of the extended points and the corresponding similarity.

6. The computing apparatus according to claim 5, wherein the processor is further used for:
   determining a matching function according to the weighted operation; and
   minimizing an error between the extended part and the target structure according to the matching function.

7. The computing apparatus according to claim 6, wherein the processor is further used for:
   determining the matching function by a least squares method.

8. The computing apparatus according to claim 5, wherein the processor is further used for:
   determining a material of the target structure according to materials of the at least two neighboring structures.

* * * * *